United States Patent
Kim et al.

(10) Patent No.: US 10,026,961 B2
(45) Date of Patent: Jul. 17, 2018

(54) POSITIVE ACTIVE MATERIAL FOR RECHARGEABLE LITHIUM BATTERY, METHOD OF PREPARING SAME, AND RECHARGEABLE LITHIUM BATTERY INCLUDING SAME

(71) Applicant: SAMSUNG SDI CO., LTD., Yongin-si, Gyeonggi-do (KR)

(72) Inventors: Young-Ki Kim, Yongin-si (KR); Na-Ri Park, Yongin-si (KR); Young-Hun Lee, Yongin-si (KR); Soon-Rewl Lee, Yongin-si (KR); Ick-Kyu Choi, Yongin-si (KR); Yong-Chul Park, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 123 days.

(21) Appl. No.: 14/536,398

(22) Filed: Nov. 7, 2014

(65) Prior Publication Data

US 2015/0221945 A1 Aug. 6, 2015

(30) Foreign Application Priority Data

Feb. 6, 2014 (KR) ........................ 10-2014-0013846

(51) Int. Cl.
*H01M 4/525* (2010.01)
*H01M 10/052* (2010.01)
*C01G 51/00* (2006.01)
*H01M 4/02* (2006.01)

(52) U.S. Cl.
CPC ............ *H01M 4/525* (2013.01); *C01G 51/42* (2013.01); *C01G 51/50* (2013.01); *H01M 10/052* (2013.01); *C01P 2002/50* (2013.01); *C01P 2002/52* (2013.01); *C01P 2002/72* (2013.01); *C01P 2004/03* (2013.01); *C01P 2004/32* (2013.01); *C01P 2006/10* (2013.01); *C01P 2006/11* (2013.01); *H01M 2004/021* (2013.01); *Y10T 428/2982* (2015.01)

(58) Field of Classification Search
CPC ............................ H01M 4/525; H01M 10/052
See application file for complete search history.

(56) References Cited

U.S. PATENT DOCUMENTS

| | | | | |
|---|---|---|---|---|
| 5,665,491 A | * | 9/1997 | Tomiyama | H01M 4/131 429/218.1 |
| 2008/0118846 A1 | * | 5/2008 | Lee | H01M 4/131 429/341 |
| 2009/0316334 A1 | * | 12/2009 | Fukumine | H01G 11/24 361/502 |

FOREIGN PATENT DOCUMENTS

| | | | | |
|---|---|---|---|---|
| JP | 2005-235416 | * | 9/2005 | H01M 4/58 |
| KR | 10-1999-0048468 A | | 7/1999 | |
| KR | 10-2009-0019339 A | | 2/2009 | |

* cited by examiner

*Primary Examiner* — Osei K Amponsah
(74) *Attorney, Agent, or Firm* — Knobbe Martens Olson & Bear LLP (57) ABSTRACT

Disclosed are a positive active material for a rechargeable lithium battery, a method of preparing same and rechargeable lithium battery including the same, wherein the positive active material includes lithium cobalt-based compound having pH of greater than about 7 and less than about 10.

8 Claims, 7 Drawing Sheets

POSITIVE ACTIVE MATERIAL FOR RECHARGEABLE LITHIUM BATTERY, METHOD OF PREPARING SAME, AND RECHARGEABLE LITHIUM BATTERY INCLUDING SAME

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application claims priority to and the benefit of Korean Patent Application No. 10-2014-0013846 filed in the Korean Intellectual Property Office on Feb. 6, 2014, the disclosure of which is incorporated herein by reference in its entirety.

BACKGROUND

Field

This disclosure relates to a positive active material for a rechargeable lithium battery, a method of preparing the same, and a rechargeable lithium battery including the same.

Description of the Related Technology

Lithium rechargeable batteries have recently drawn attention as a power source for small portable electronic devices. Lithium rechargeable batteries use an organic electrolyte solution and thereby, have twice or more as high a discharge voltage than a conventional battery using an alkali aqueous solution. Accordingly, lithium batteries have high energy density.

A lithium-transition metal oxide having a structure being capable of intercalating lithium ions, such as $LiCoO_2$, $LiMn_2O_4$, $LiNi_{1-x}Co_xO_2$ (0<x<1), and the like may be used as positive active materials of a rechargeable lithium battery.

Various carbon-based materials such as artificial graphite, natural graphite, and hard carbon, which intercalate and deintercalate lithium, and oxides such as tin oxide, lithium vanadium-based oxide, and the like have been used as negative active materials of a rechargeable lithium battery.

SUMMARY

One embodiment provides a positive active material for a rechargeable lithium battery having excellent capacity, cycle-life, and stability.

Another embodiment provides a method of preparing the positive active material.

Yet another embodiment provides a rechargeable lithium battery including the positive active material.

According to one embodiment, provided is a positive active material for a rechargeable lithium battery including a lithium cobalt-based compound having pH of greater than about 7 and less than about 10.

In some embodiments, the lithium cobalt-based compound may be represented by Chemical Formula 1.

Chemical Formula 1 wherein in Chemical Formula 1,
0.95≤a≤1.03, 0≤x<0.5, and
M is Ni, Mn, B, Mg, Ca, Sr, Ba, Ti, V, Cr, Fe, Cu, Al, or a combination thereof.

In some embodiments, the positive active material may have pH of about 9 to about 10.

In some embodiments, the positive active material may have a spherical shape.

Some embodiments, provide a method of preparing a positive active material for a rechargeable lithium battery that includes mixing the cobalt raw material and the lithium raw material to form a mixture; and heat-treating the mixture. In some embodiments, the method further comprises combining a M containing raw material (M is Ni, Mn, B, Mg, Ca, Sr, Ba, Ti, V, Cr, Fe, Cu, Al, or a combination thereof) with the cobalt raw material and the lithium raw material.

In some embodiments, the cobalt raw material may be spherical shaped particles of $Co_3O_4$, and particularly spherical shaped particles of $Co_3O_4$ prepared using a co-precipitation process. In some embodiments, the cobalt raw material includes a secondary particle in which a primary particle is assembled.

In some embodiments, the lithium raw material may be lithium carbonate or lithium hydroxide. In some embodiments, $Li_2CO_3$ or LiOH may be used as a raw material for the preparation of the positive active material are not present in the positive active material after completion of the method of preparing the positive active material. In some embodiments, $Li_2CO_3$ or LiOH are not substantially present in the positive active material. In some embodiments, $Li_2CO_3$ or LiOH are not detectable in the positive active material using a standard solution titration method. In some embodiments, $Li_2CO_3$ or LiOH are not present in the positive active material.

In some embodiments, the process of heat-treating may be performed at about 1000° C. to about 1100° C.

Yet another embodiment provides a rechargeable lithium battery including the positive electrode including a positive active material; a negative electrode including a negative active material; and an electrolyte including a lithium salt and an organic solvent.

Other embodiments are included in the following detailed description.

The positive active material for a rechargeable lithium battery according to one embodiment has excellent capacity, cycle-life characteristics, and stability.

DETAILED DESCRIPTION

Hereinafter, embodiments of the present disclosure are described in detail. However, these embodiments are exemplary, and this disclosure is not limited thereto.

According to one embodiment, provided is a positive active material for a rechargeable lithium battery including a lithium cobalt-based compound having pH of greater than about 7 and less than about 10. In some embodiments, the lithium cobalt-based compound may have pH of about 9 to about 10. In some embodiments, the positive active material may have pH of about 9 to about 10.

When the positive active material has pH within the range, excellent initial charge and discharge efficiency and cycle-life characteristics may be obtained. Herein, when pH of a positive active material is in a range of about 9 to about 10 regardless of a measurement method and condition, excellent initial charge and discharge efficiency and cycle-life characteristics may be obtained, and the pH is included in the scope of the present invention.

In some embodiments, the lithium cobalt-based compound may be represented by Chemical Formula 1:

$$Li_aCo_{1-x}M_xO_2 \quad \text{Chemical Formula 1}$$

wherein in Chemical Formula 1,
0.95≤a≤1.03, 0≤x<0.5, and
M is Ni, Mn, B, Mg, Ca, Sr, Ba, Ti, V, Cr, Fe, Cu, Al, or a combination thereof.

In some embodiments, the positive active material may be particles having a spherical shape.

In some embodiments, $Li_2CO_3$ or LiOH are not substantially present in the positive active material. In some embodiments, $Li_2CO_3$ or LiOH are not detectable in the positive active material using a standard solution titration method. In some embodiments, $Li_2CO_3$ or LiOH are not present in the positive active material. In some embodiments, the positive active material includes almost no $Li_2CO_3$ or LiOH as a lithium raw material used in its manufacturing process. Accordingly, the positive active material may be effectively suppressed from a side reaction due to the remaining $Li_2CO_3$ or LiOH, that is, from an unsatisfactory influence on battery characteristics.

Another embodiment provides a method of preparing a positive active material for a rechargeable lithium battery that includes mixing a cobalt raw material and a lithium raw material in a solvent; and heat-treating the mixture. The method may further include combining a cobalt raw material and a lithium raw material in a solvent, before mixing. Hereinafter, a method of preparing the positive active material is illustrated in detail.

First, a cobalt raw material and a lithium raw material are mixed.

In some embodiments, the cobalt raw material may be spherically-shaped particles of $Co_3O_4$. In some embodiments, the $Co_3O_4$ may be prepared in a co-precipitation method by co-precipitating a cobalt precursor such as $CoSO_4$, $CoNO_2$, $CoCl_2$, or a combination thereof along with a base such as NaOH, $NH_4OH$, or a combination thereof in a solvent to obtain $Co(OH)_2$ and heat-treating the $Co(OH)_2$. In some embodiments, the co-precipitation may be performed under an air atmosphere. Herein, the heat-treatment may be performed at about 400° C. to about 800° C. for about 5 hours to about 10 hours. The solvent may be water.

This synthesized $Co_3O_4$ may have an adjusted particle size and thus, be easily synthesized to have a small or large particle different from a conventional $Co_3O_4$ raw material. In addition, the various particle distribution of positive active material may realize high density.

In some embodiments, the cobalt raw material may have a secondary particle shape in which primary particles are assembled. In some embodiments, the secondary particle may have an average particle diameter (D50) of about 2 μm to about 30 μm. In some embodiments, the cobalt raw material may have small particles or large particles. When the secondary particle has an average particle diameter of greater than about 30 μm, battery characteristics of an active material layer formed by using the positive active material obtained from the cobalt raw material may be deteriorated.

In addition, the lithium raw material may be lithium carbonate, lithium hydroxide, or a combination thereof.

In some embodiments, the cobalt raw material and the lithium raw material may be mixed so that a mole ratio of cobalt and lithium may be about 1:0.95 to about 1:1.03. When the cobalt and lithium raw materials are mixed within the range, cycle-life characteristics may be improved by providing a positive active material having appropriate capacity characteristics and desired pH.

In some embodiments, $Li_2CO_3$ or LiOH are not substantially present in a final product. In some embodiments, $Li_2CO_3$ or LiOH are not substantially present in the positive active material. In some embodiments, $Li_2CO_3$ or LiOH are not detectable in the positive active material using a standard solution titration method. In some embodiments, $Li_2CO_3$ or LiOH are not present in the positive active material. In some embodiments, $Li_2CO_3$ and LiOH typically produced as an addition product during a process of preparing the positive active material are not substantially present in the final positive active material, and thus, battery characteristic deterioration due to the $Li_2CO_3$ and LiOH may be suppressed.

In the mixing process, an M raw material (M is Ni, Mn, B, Mg, Ca, Sr, Ba, Ti, V, Cr, Fe, Cu, Al, or a combination thereof) may be further used. In some embodiments, the M raw material may be M-containing oxide, hydroxide, nitrate, acetate, or a combination thereof. In some embodiments, the M raw material may be used in a mole ratio of about 0.001 mol to about 0.1 mol of M relative to about 1 mol of cobalt.

In some embodiments, the heat-treatment may be performed at about 1000° C. to about 1100° C.

Another embodiment provides a rechargeable lithium battery that includes the positive electrode including a positive active material, a negative electrode including a negative active material, and an electrolyte including an organic solvent and a lithium salt.

In some embodiments, the positive electrode may include a positive current collector and a positive active material layer formed on the positive current collector. In some embodiments, the positive active material may be a positive active material as disclosed and described herein.

In the positive active material layer, the positive active material may be included in a weight of about 90 wt % to about 98 wt % based on the total weight of the positive active material layer.

In some embodiments, the positive active material layer may also include a binder and a conductive material. Herein, each amount of the binder and conductive material may be about 1 wt % to about 5 wt % based on the total weight of the positive active material layer.

The binder improves binding properties of positive active material particles with one another and with a current collector. The binder may be a non-aqueous binder, an aqueous binder, or a combination thereof.

In some embodiments, the non-aqueous binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

In some embodiments, the aqueous binder may include a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the aqueous binder is used as the positive electrode binder, a cellulose-based compound may be further used to provide viscosity. In some embodiments, the cellulose-based compound includes one or more of carboxylmethyl cellulose, hydroxypropylmethyl cellulose, methyl cellulose, or alkali metal salts thereof. In some embodiments, the alkali metal may be Na, K, or Li. Such a thickener may be included in an amount of about 0.1 to about 3 parts by weight based on 100 parts by weight of the positive active material.

The conductive material is included to provide electrode conductivity. Any electrically conductive material may be used as a conductive material unless it causes a chemical change. Specific examples of the conductive material may be a carbon-based material natural graphite, artificial graphite, carbon black, acetylene black, ketjen black, denka black, carbon fiber and the like, a metal-based material such as a metal powder or a metal fiber and the like of copper, nickel, aluminum, silver, and the like, a conductive polymer such as a polyphenylene derivative and the like, or a mixture thereof.

The current collector may use Al, but is not limited thereto.

According to one embodiment, a positive electrode may have active mass density of about 3.80 g/cc to about 4.25 g/cc. According to another embodiment, the positive electrode may have active mass density of greater than about 3.80 g/cc to less than or equal to about 4.25 g/cc. In the present disclosure, the active mass indicates a positive active material layer. A positive electrode according to one embodiment may have higher active mass density than conventional active mass density of about 3.0 g/cc to about 3.8 g/cc, since the positive active material particles may have a spherical shape. In some embodiments, the positive active material particles may have may include a spherical shape, an oval shape, and the like.

In some embodiments, the negative electrode includes a current collector and a negative active material layer formed on the current collector, and the negative active material layer includes a negative active material.

In some embodiments, the negative active material includes a material that reversibly intercalates/deintercalates lithium ions, a lithium metal, a lithium metal alloy, a material being capable of doping/dedoping lithium, or a transition metal oxide.

In some embodiments, the material that can reversibly intercalate/deintercalate lithium ions includes a carbon material. The carbon material may be any generally-used carbon-based negative active material in a lithium ion rechargeable battery. Examples of the carbon material include crystalline carbon, amorphous carbon, and mixtures thereof. In some embodiments, the crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

In some embodiments, the lithium metal alloy may include lithium and an element selected from Na, K, Rb, Cs, Fr, Be, Mg, Ca, Sr, Si, Sb, Pb, In, Zn, Ba, Ra, Ge, Al, and Sn.

In some embodiments, the material being capable of doping/dedoping lithium may include Si, a Si—C composite, $SiO_x$, (0<x<2), a Si-Q alloy (wherein Q is an element selected from an alkali metal, an alkaline-earth metal, a Group 13 element, a Group 14 element, a Group 15 element, a Group 16 element, a transition element, a rare earth element, and a combination thereof, and not Si), Sn, $SnO_2$, a Sn—R alloy (wherein R is an element selected from an alkali metal, an alkaline-earth metal, a Group 13 element, a Group 14 element, a Group 15 element, a Group 16 element, a transition element, a rare earth element, and a combination thereof, and not Sn), and the like. At least one of these materials may be mixed with $SiO_2$. In some embodiments, the elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

In some embodiments, the transition metal oxide includes vanadium oxide, lithium vanadium oxide, and the like.

In the negative active material layer, the negative active material may be included in an amount of about 95 wt % to about 99 wt % based on the total weight of the negative active material layer.

In some embodiments, the negative active material layer may include a binder and optionally, a conductive material. In some embodiments, the negative active material layer may include about 1 wt % to about 5 wt % of a binder based on the total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

In some embodiments, the binder improves binding properties of negative active material particles with one another and with a current collector. The binder includes a non-water-soluble binder, a water-soluble binder, or a combination thereof.

In some embodiments, the non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

In some embodiments, the water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. In some embodiments, the cellulose-based compound includes one or more of carboxylmethyl cellulose, hydroxypropylmethyl cellulose, methyl cellulose, or alkali metal salts thereof. In some embodiments, the alkali metal may be Na, K, or Li. Such a thickener may be included in an amount of about 0.1 parts by weight to about 3 parts by weight based on 100 parts by weight of the negative active material.

The conductive material is included to provide electrode conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of metal powder or metal fiber including copper, nickel, aluminum, silver, and the like; a conductive polymer such as a polyphenylene derivative; or a mixture thereof.

In some embodiments, the current collector may include one selected from a copper foil, a nickel foil, a stainless steel foil, a titanium foil, a nickel foam, a copper foam, a polymer substrate coated with a conductive metal, and a combination thereof, but is not limited thereto.

In some embodiments, the negative electrode and positive electrode may be manufactured by a method including mixing each active material, a conductive material, and a binder in a solvent to prepare active material compositions, and coating the active material compositions on a current collector. The electrode manufacturing method is well known, and thus is not described in detail in the present specification. In some embodiments, the solvent may be water since the positive electrode uses a water-soluble binder. In addition, when the negative electrode is a non-water-soluble binder, the solvent may be an organic solvent such as N-methylpyrrolidone and the like, while when the water-soluble binder is used, the solvent may be water.

In some embodiments, the electrolyte includes an organic solvent and a lithium salt.

The organic solvent serves as a medium of transmitting ions taking part in the electrochemical reaction of the battery.

In some embodiments, the organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. In some embodiments, the ester-based solvent may include methyl acetate, ethyl acetate, n-propyl acetate, dimethyl lactate, methyl propionate, ethylpropionate, γ-butyrolactone, decanolide, valerolactone, mevalonolactone, caprolactone, and the like. In some embodiments, the ether-based solvent may include dibutyl ether, tetraglyme, diglyme, dimethoxyethane, 2-methyltetrahydrofuran, tetrahydrofuran, and the like, and the ketone-based solvent may include cyclohexanone and the like. The alcohol-based solvent include ethyl alcohol, isopropyl alcohol, and the like, and examples of the aprotic solvent include nitriles such as R—CN (where R is a C2 to C20 linear, branched, or cyclic hydrocarbon group, a double bond, an aromatic ring, or an ether bond), amides such as dimethylformamide, dioxanes such as 1,3-dioxolane, sulfolanes, and the like.

In some embodiments, the organic solvent may be used singularly or in a mixture. When the organic solvent is used in a mixture, the mixture ratio can be controlled in accordance with a desirable battery performance.

In some embodiments, the carbonate-based solvent may include a mixture with a cyclic carbonate and a linear carbonate. In some embodiments, the cyclic carbonate and linear carbonate are mixed together in a volume ratio of about 1:1 to about 1:9. When the mixture is used as an electrolyte, it may have enhanced performance.

In some embodiments, the organic solvent may further include an aromatic hydrocarbon-based solvent as well as the carbonate-based solvent. The carbonate-based solvent and aromatic hydrocarbon-based solvent may be mixed together in a volume ratio of about 1:1 to about 30:1.

In some embodiments, the aromatic hydrocarbon-based organic solvent may be an aromatic hydrocarbon-based compound represented by Chemical Formula 3:

Chemical Formula 3 wherein in Chemical Formula 3, $R_1$ to $R_6$ are the same or different and are selected from hydrogen, a halogen, a C1 to C10 alkyl group, a haloalkyl group, and a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

In some embodiments, the electrolyte may further include vinylene carbonate or an ethylene carbonate-based compound represented by Chemical Formula 2 to improve cycle life:

Chemical Formula 2 wherein in Chemical Formula 2, $R_7$ and $R_8$ are the same or different and may be each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the additive for improving cycle life may be flexibly used within an appropriate range.

The lithium salt is dissolved in an organic solvent, supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, LiClO$_4$, LiAlO$_2$, LiAlCl$_4$, LiN(C$_x$F$_{2x+1}$SO$_2$)(C$_y$F$_{2y+1}$SO$_2$) (where x and y are natural numbers of 1 to 20, respectively), LiCl, LiI and LiB(C$_2$O$_4$)$_2$ (lithium bis(oxalato)borate). In some embodiments, the lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

In some embodiments, the rechargeable lithium battery may further include a separator between the negative electrode and the positive electrode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

A rechargeable lithium battery may be classified as a lithium ion battery, a lithium ion polymer battery, and a lithium polymer battery according to the presence of a separator and the kind of an electrolyte used therein. In some embodiments, the rechargeable lithium battery may have a variety of shapes and sizes and thus, may include a cylindrical, prismatic, coin, or pouch-type battery and a thin film type or a bulky type in size. Structures and manufacturing methods for lithium ion batteries pertaining to this disclosure are well known in the art.

Figure 1:
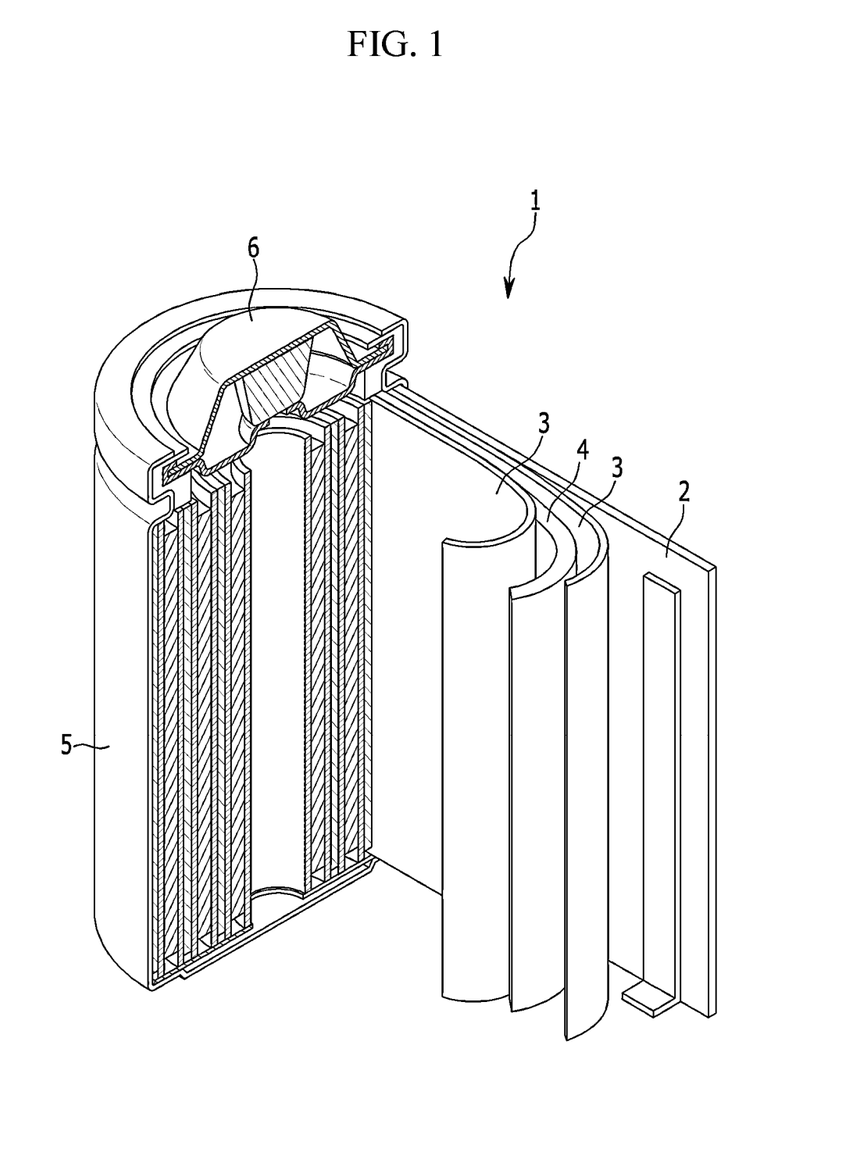
FIG. 1 is a schematic view showing the structure of a positive active material according to one embodiment.

FIG. 1 is a schematic view showing a structure of a positive active material according to one embodiment. Referring to FIG. 1, the rechargeable lithium battery 1 includes a positive electrode 2, a negative electrode 4, and a separator 3 disposed between the positive electrode 2 and the negative electrode 4, an electrolyte (not shown) impregnated therein, a battery case 5 including the above, a sealing member 6 sealing the battery case 5.

Hereinafter, examples and comparative examples are described. These examples, however, are not in any sense to be interpreted as limiting the scope of the embodiments.

Example 1: Synthesis of Li$_{1.00}$Co$_{0.99}$Mg$_{0.01}$O$_2$ Positive Active Material Spherically-shaped Co$_3$O$_4$ was manufactured by co-precipitating CoSO$_4$ and NaOH in water under an air atmosphere to prepare Co(OH)$_2$ and heat-treating the Co(OH)$_2$ at 800° C. for 5 hours.

Spherically-shaped Co$_3$O$_4$ powder (68.03 g) was mixed with Li$_2$CO$_3$ powder (31.63 g) and MgO powder (0.34 g), and the mixture was fired at 1070° C. for 10 hours. The fired powder was ground, obtaining a Li$_{1.00}$Co$_{0.99}$Mg$_{0.01}$O$_2$ positive active material. The positive active material had pH of 9.60. The pH was measured by adding 2 g of the positive active material to 100 g of water in a 250 ml beaker and agitating the resulting mixture for 5 minutes.

Example 2: Synthesis of Li$_{1.00}$Co$_{0.99}$Mg$_{0.01}$Ti$_{0.002}$O$_2$ Positive Active Material Spherically-shaped Co$_3$O$_4$ powder (67.89 g) of Example 1 was mixed with Li$_2$CO$_3$ powder (31.63 g), MgO powder (0.34 g), and TiO$_2$ powder (0.14 g), and the mixture was fired at 1070° C. for 10 hours. The fired powder was ground, obtaining a Li$_{1.00}$Co$_{0.99}$Mg$_{0.01}$Ti$_{0.002}$O$_2$ positive active material. The positive active material had pH of 9.60. The pH was measured by adding 2 g of the positive active material to 100 g of water in a 250 ml beaker and agitating the resulting mixture for 5 minutes.

Comparative Example 1: Synthesis of Li$_{1.05}$Co$_{0.99}$Mg$_{0.01}$Ti$_{0.002}$O$_2$ Positive Active Material Spherically-shaped Co$_3$O$_4$ powder (66.83 g) of Example 1 was mixed with Li$_2$CO$_3$ powder (32.69 g), MgO powder (0.34 g), and TiO$_2$ powder (0.14 g), and the mixture was fired at 1030° C. for 10 hours. The fired powder was ground, obtaining a Li$_{1.05}$Co$_{0.99}$Mg$_{0.01}$Ti$_{0.002}$O$_2$ positive active material. The positive active material had pH of 10.42. The pH was measured by adding 2 g of the positive active material to 100 g of water in a 250 ml beaker and agitating the resulting mixture for 5 minutes.

Comparative Example 2: Synthesis of Li$_{1.05}$Co$_{0.99}$Mg$_{0.01}$Ti$_{0.002}$O$_2$ Positive Active Material Li$_2$CO$_3$ powder (32.69 g), amorphous Co$_3$O$_4$ powder (66.83 g), MgO powder (0.34 g), and TiO$_2$ powder (0.14 g) were mixed, and the mixture was fired at 1030° C. for 10 hours. The fired powder was ground, obtaining a Li$_{1.05}$Co$_{0.99}$Mg$_{0.01}$Ti$_{0.002}$O$_2$ positive active material. The obtained positive active material had pH of 10.03. The pH was measured by adding 2 g of the positive active material to 100 g of water in a 250 ml beaker and agitating the resulting mixture for 5 minutes.

Comparative Example 3: Synthesis of Li$_{1.00}$Co$_{0.99}$Mg$_{0.01}$Ti$_{0.002}$O$_2$ Positive Active Material Li$_2$CO$_3$ powder (28.56 g), spherically-shaped Co(OH)$_2$ powder (71.00 g), MgO powder (0.31 g), and TiO$_2$ powder (0.12 g) were mixed, and this mixture was primarily fired at 1070° C. for 10 hours. The fired powder was ground, obtaining a Li$_{1.00}$Co$_{0.99}$Mg$_{0.01}$Ti$_{0.002}$O$_2$ positive active material.

Example 3: Manufacture of Half Cell 96 wt % of the positive active material according to Example 1, 2 wt % of a polyvinylidene fluoride binder, and 2 wt % of a denka black conductive material were mixed in an N-methyl pyrrolidone solvent, preparing positive active material slurry.

The positive active material slurry was coated on an Al foil and then, dried and compressed, manufacturing a positive electrode. Herein, the positive electrode had active mass density of 4.05 g/cc.

The positive electrode, a lithium metal counter electrode, and an electrolyte solution were used to manufacture a half-cell in a conventional method. Herein, the electrolyte solution was prepared by mixing ethylene carbonate, ethylmethyl carbonate, and dimethyl carbonate to prepare an organic mixed solvent (a volume ratio of 3:3:4) and dissolving 1.15M of LiPF$_6$ (a lithium salt) therein.

Example 4: Manufacture of Half Cell

A half-cell was manufactured according to the same method as Example 3 except for using the positive active material of Example 2 instead of the positive active material of Example 1.

Comparative Example 4: Manufacture of Half Cell

A half-cell was manufactured according to the same method as Example 3 except for using the positive active material of Comparative Example 1 instead of the positive active material of Example 1.

Comparative Example 5: Manufacture of Half Cell

A half-cell was manufactured according to the same method as Example 3 except for using the positive active material of Comparative Example 2 instead of the positive active material of Example 1.

Comparative Example 6: Manufacture of Half Cell

A half-cell was manufactured according to the same method as Example 3 except for using the positive active material of Comparative Example 3 instead of the positive active material of Example 1.

Example 5: Manufacture of Rechargeable Lithium Battery Cell

Negative active material slurry was prepared by mixing 98 wt % of a graphite negative active material, 1 wt % of carboxylmethyl cellulose, and 1 wt % of a styrene butadiene rubber in a water solvent.

The negative active material slurry was coated on a Cu foil current collector and then, dried and compressed, manufacturing a negative electrode.

The negative electrode was used along with the positive electrode of Example 3 and an electrolyte solution to manufacture a rechargeable lithium battery cell (a full cell) in a general method. Herein, the electrolyte solution was prepared by mixing ethylene carbonate, ethylmethyl carbonate, and dimethyl carbonate to prepare an organic mixed solvent (a volume ratio of 3:3:4) and dissolving 1.15M of $LiPF_6$ (a lithium salt) therein.

Example 6: Manufacture of Rechargeable Lithium Battery Cell

A rechargeable lithium battery cell was manufactured according to the same method as Example 5 except for using the positive electrode of Example 4 instead of the positive electrode of Example 3.

Comparative Example 7: Manufacture of Rechargeable Lithium Battery Cell

A rechargeable lithium battery cell was manufactured according to the same method as Example 3 except for using the positive electrode of Comparative Example 4 instead of the positive electrode of Example 3.

Example 7: Manufacture of Positive Electrode 96 wt % of the positive active material of Example 1, 2 wt % of a polyvinylidene fluoride binder, and 2 wt % of a denka black conductive material were mixed in an N-methyl pyrrolidone solvent, preparing positive active material slurry.

The positive active material slurry was coated on an Al foil and then, dried and compressed, manufacturing a positive electrode. Herein, the positive electrode had active mass density of 4.00 g/cc.

Comparative Example 8: Manufacture of Positive Electrode

A positive electrode was manufactured according to the same method as Example 7 except for using the positive active material of Comparative Example 1 instead of the positive active material of Example 1.

Rate Capability Data

The half-cells according to Examples 3 and 4 and Comparative Examples 4 to 6 were once charged and discharged at 1 C(=160 mAh/g) up to 4.5 V, charge and discharge capacity of the half-cells was measured, and the results are provided in Table 1. In addition, charge and discharge efficiency (discharge capacity/charge capacity, %) of the half-cells was measured, and the results are provided in Table 1.

Furthermore, the half-cells according to Examples 3 and 4 and Comparative Examples 4 to 6 were respectively once charged and discharged with 0.1 C, 0.2 C, 0.5 C and 1 C, and discharge capacity of the half-cells was measured. The measured discharge capacity was provided in Table 1. In addition, each discharge capacity ratio at 0.2 C, 0.5 C, and 1 C based on 100% of discharge capacity at 0.1 C was calculated, and the results are provided in Table 1. The measured discharge capacity and its discharge capacity ratio were respectively provided in FIGS. 2 and 3.

TABLE 1

| | | Example 3 | Example 4 | Comparative Example 4 | Comparative Example 5 | Comparative Example 6 |
|---|---|---|---|---|---|---|
| First charge and discharge | Charge capacity (mAh/g) | 200.9 | 200.6 | 196.0 | 195.3 | 193.6 |
| | Discharge capacity (mAh/g) | 197.5 | 196.6 | 185.1 | 182.4 | 180.3 |
| | Charge and discharge efficiency (%) | 98.3 | 98 | 94.4 | 93.4 | 93.1 |
| Discharge capacity (mAh/g) | 0.1 C | 197.5 | 196.6 | 185.1 | 182.4 | 180.3 |
| | 0.2 C | 192.1 | 191.8 | 175.8 | 175.1 | 172.3 |
| | 0.5 C | 183.9 | 186.7 | 165.3 | 163.2 | 159.6 |
| | 1 C | 179.5 | 182.7 | 155.9 | 152.7 | 150.3 |
| Discharge capacity ratio (%) | 0.1 C | 100 | 100 | 100 | 100 | 100 |
| | 0.2 C | 97.3 | 97.6 | 95.0 | 96.0 | 95.6 |
| | 0.5 C | 93.1 | 94.9 | 89.3 | 89.5 | 88.5 |
| | 1 C | 90.9 | 92.9 | 84.2 | 83.7 | 83.4 |

Figure 2:
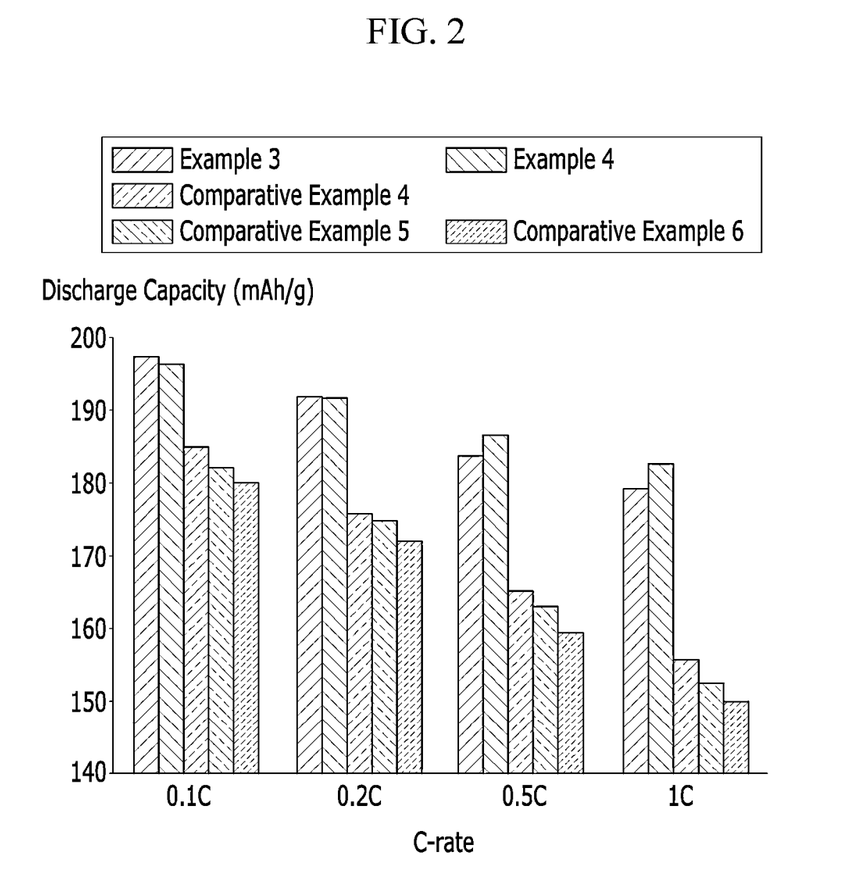
FIG. 2 is a graph showing discharge capacity of the battery cells according to Examples 3 and 4 and Comparative Examples 4 to 6.
Figure 3:
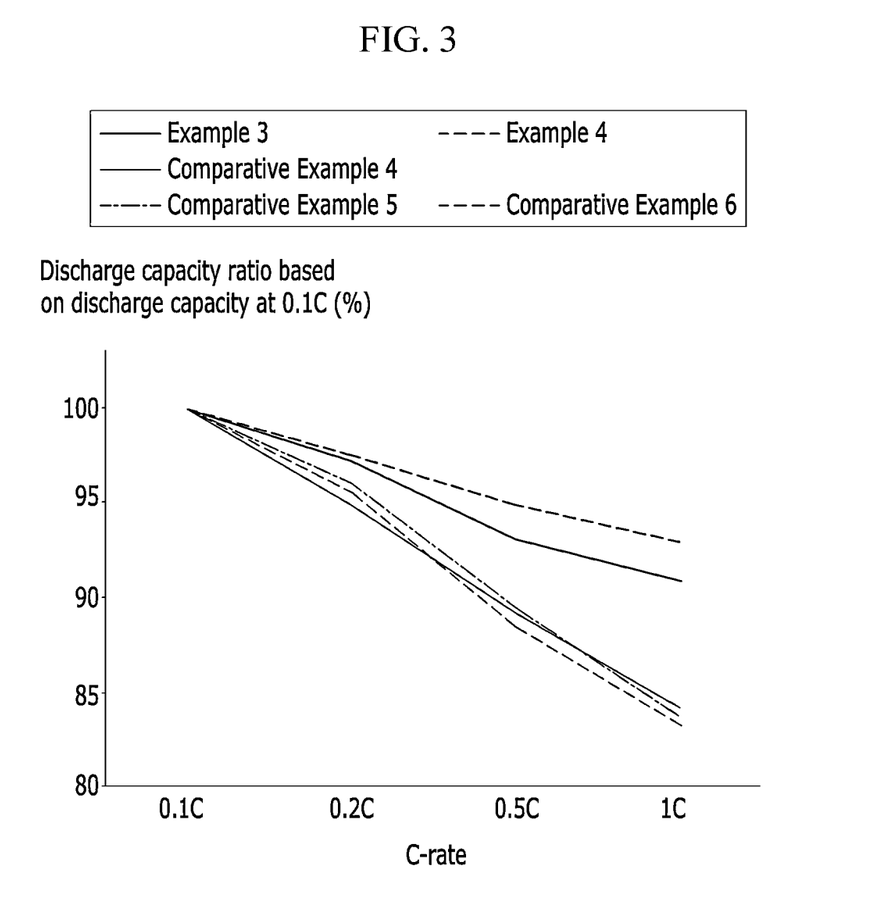
FIG. 3 is a graph showing discharge capacity ratios of the battery cells of Examples 3 and 4 and Comparative Examples 4 to 6.

As shown in Table 1 and FIGS. 2 and 3, the cells using the positive active material prepared by using spherically-shaped $Co_3O_4$ in a co-precipitation method according to Examples 3 and 4 showed excellent charge and discharge capacity and charge and discharge efficiency compared with the battery cells using amorphous $Co_3O_4$ or spherical shaped $Co(OH)_2$ according to Comparative Examples 4 and 6. In addition, the cell using the positive active material excessively including lithium according to Comparative Example 5 showed deteriorated charge and discharge capacity and charge and discharge efficiency compared with the cells according to Examples 3 and 4.

In addition, the cells of Examples 3 and 4 showed an excellent discharge capacity and discharge capacity ratio according to a charge and discharge rate and in particular, excellent results at a high rate compared with the cells of Comparative Examples 4 to 6.

Remaining Lithium Data

In the positive active materials of Examples 1 to 2 and Comparative Examples 1 to 3, the remaining amounts of $Li_2CO_3$ and LiOH used as a lithium precursor were measured in a standard solution titration method, and the results are provided in Table 2.

TABLE 2

|  | $Li_2CO_3$ (wt %) | LiOH (wt %) |
| --- | --- | --- |
| Example 1 | 0 (no detection) | 0 (no detection) |
| Example 2 | 0 (no detection) | 0 (no detection) |
| Comparative Example 1 | 0.10 | 0.03 |
| Comparative Example 2 | 0.12 | 0.03 |
| Comparative Example 3 | 0.06 | 0.02 |

As shown in Table 2, the $Li_2CO_3$ and LiOH did not remain in the positive active materials of Examples 1 and 2 but remained in the positive active materials of Comparative Examples 1 to 3. Since these $Li_2CO_3$ and LiOH may have an unsatisfactory influence on electrochemical reaction of a cell and thus, deteriorate battery characteristics, the active materials of Comparative Examples 1 to 3 were expected to deteriorate battery characteristics.

SEM Photograph

Figure 4:
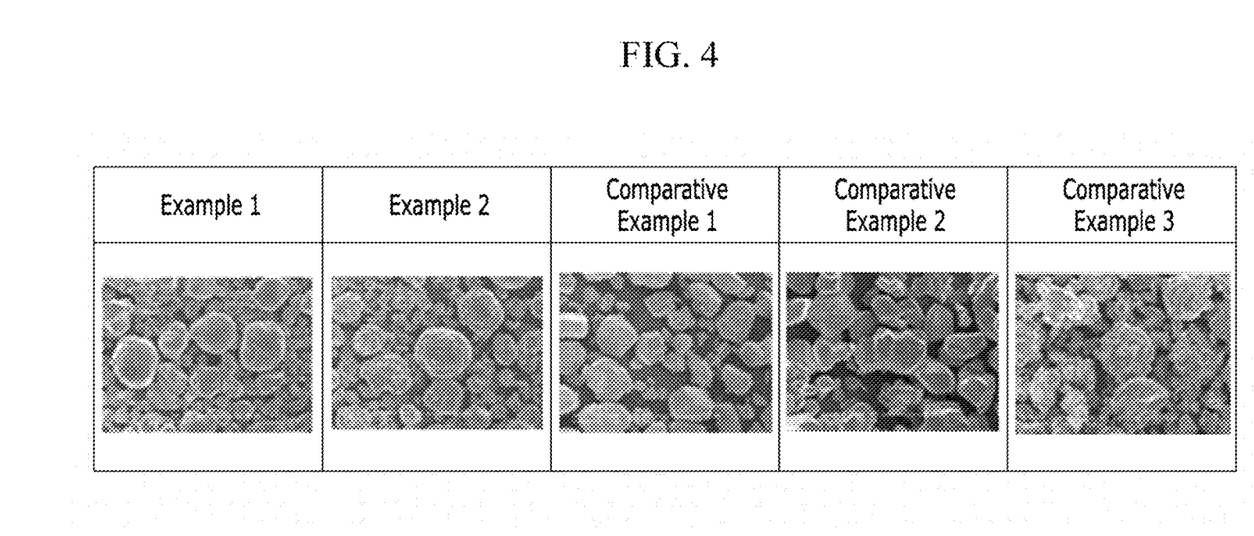
FIG. 4 shows SEM photographs of the positive active materials of Examples 1 to 2 and Comparative Examples 1 to 3.

FIG. 4 shows the SEM photographs of the positive active materials of Examples 1 to 2 and Comparative Examples 1 to 3. As shown in FIG. 4, the positive active material of Examples 1 and 2 had a spherical shape, but the positive active materials of Comparative Examples 1 and 2 had an amorphous shape and the positive active material of Comparative Example 3 had a shape obtained by assembling very tiny particulates.

Measurement of Tap Density and Pellet Density

Pellet density and tap density of the positive electrodes according to Examples 3 to 4 and Comparative Examples 4 to 6 were measured, and the results are provided in Table 3.

TABLE 3

|  | Pellet density (g/cm$^3$) | Tap density (g/mL) |
| --- | --- | --- |
| Example 3 | 3.83 | 3.04 |
| Example 4 | 3.83 | 3.04 |
| Comparative Example 4 | 3.73 | 2.90 |
| Comparative Example 5 | 3.75 | 2.80 |
| Comparative Example 6 | 3.69 | 2.64 |

As shown in Table 3, the positive electrodes of Examples 3 and 4 showed excellent pellet density and tap density compared with the positive electrodes according to Comparative Examples 4 to 6 and resultantly, was expected to provide a high-capacity battery.

Cycle-Life Characteristics

Figure 5:
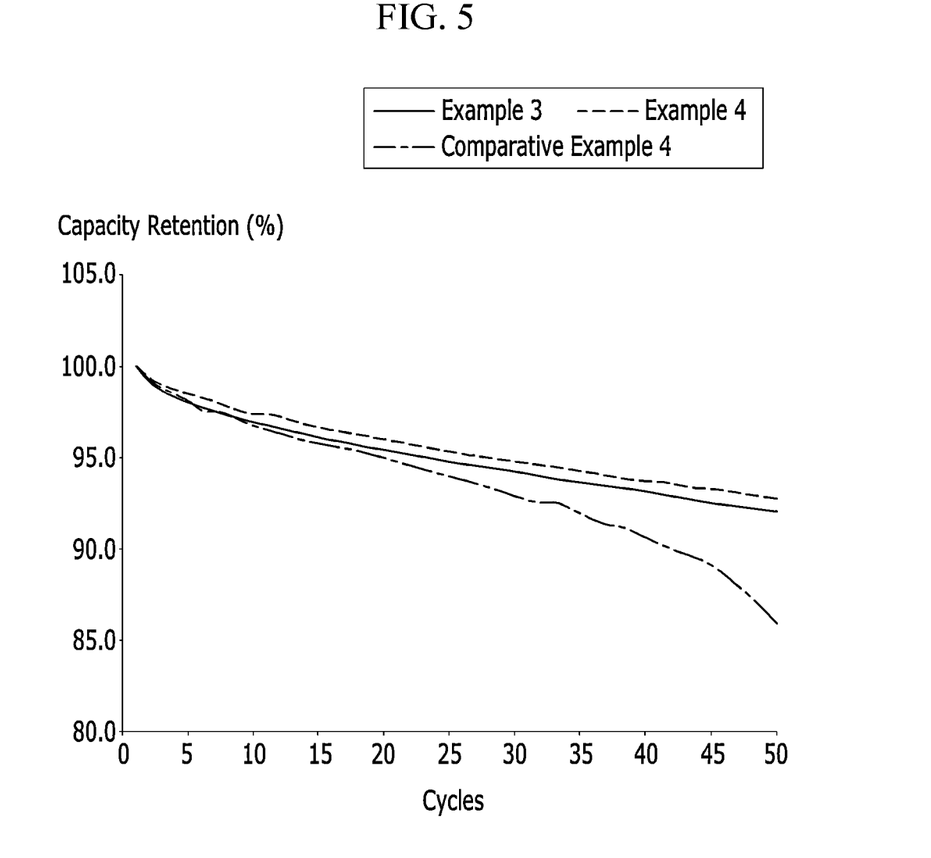
FIG. 5 is a graph showing cycle-life characteristics of the battery cells of Examples 3 to 4 and Comparative Example 4.

The cells of Examples 3 to 4 and Comparative Example 4 were 50 times charged and discharged at 25° C. under a condition of 4.5 V to 3 V and 1 C. Capacity retention of the cells depending on a charge and discharge cycle was provided in FIG. 5. As shown in FIG. 5, the cells of Examples 3 and 4 showed very excellent capacity retention compare with the cell of Comparative Example 4.

Figure 6:
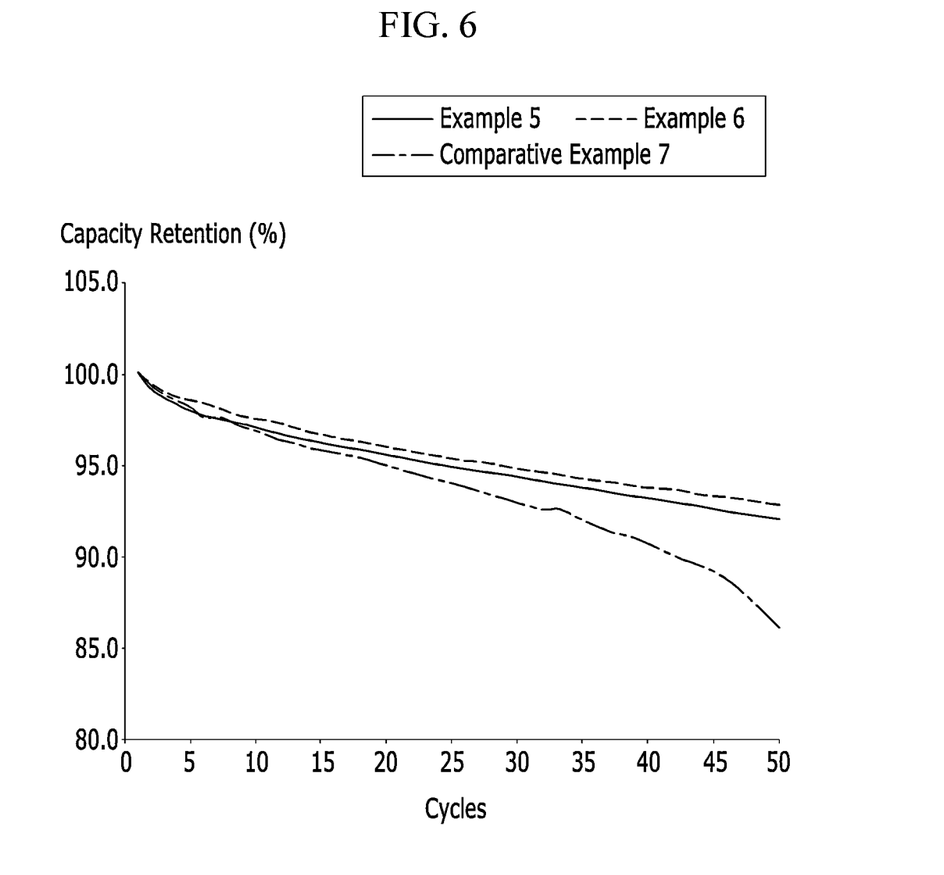
FIG. 6 is a graph showing cycle-life characteristics of battery cells of Examples 5 to 6 and Comparative Example 7.

In addition, the rechargeable lithium battery cells of Examples 5 and 6 and Comparative Example 7 were 50 times charged and discharged at 60° C. under a condition of 4.3 V to 3 V and 1 C. FIG. 6 shows capacity retention of the cells depending on a high temperature charge and discharge cycle. As shown in FIG. 6, the cells of Examples 5 and 6 showed very excellent capacity retention compared with the cell of Comparative Example 7.

Compression Characteristic Data of Electrode

Figure 7:
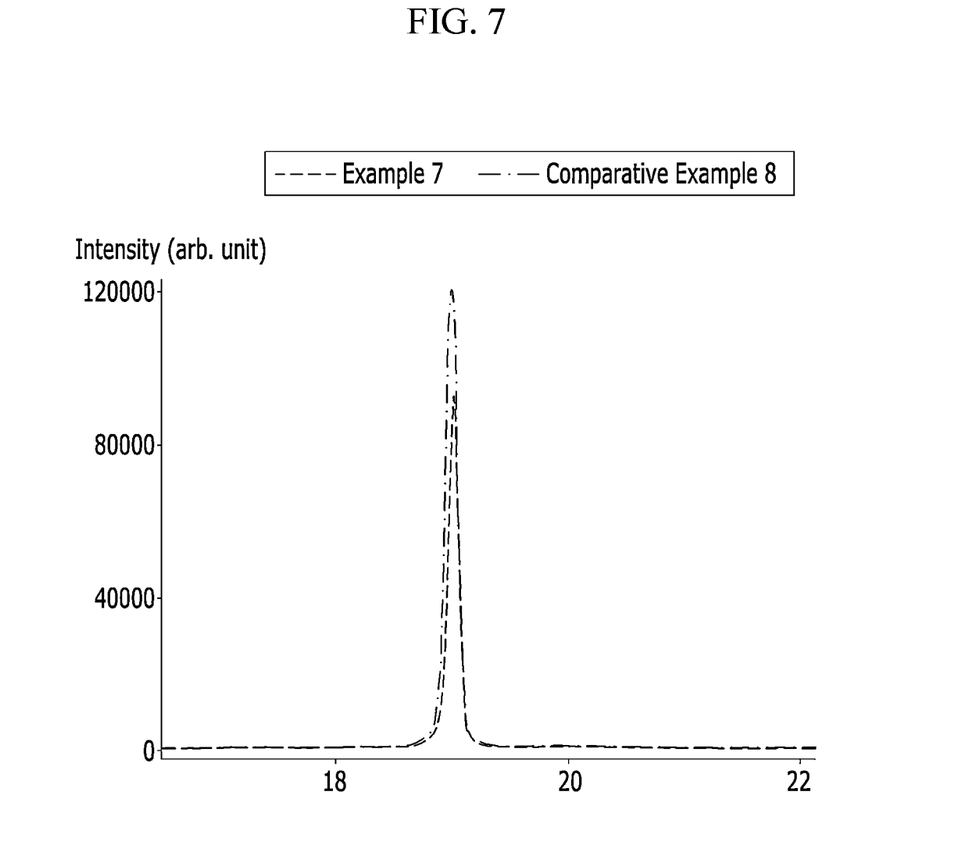
FIG. 7 is a graph showing XRD results of positive electrodes of Examples 7 and 8.

XRD of the positive electrodes of Example 7 and Comparative Example 8 was measured by using CuKα, and the results are provided in FIG. 7. As shown in FIG. 7, the positive electrode of Example 7 showed a smaller peak intensity compared with the positive electrode of Comparative Example 8. From the result, the positive active material of Example 7 showed a small crystal change since it had a spherical shape which allows it to disperse a force. Accordingly, the positive active material of Example 7 was expected to be suppressed from its side reaction with an electrolyte solution and to show excellent cycle-life characteristics.

While this disclosure has been described in connection with what is presently considered to be practical exemplary embodiments, it is to be understood that the invention is not limited to the disclosed embodiments and is intended to cover various modifications and equivalent arrangements included within the spirit and scope of the appended claims. Therefore, the aforementioned embodiments should be understood to be exemplary but not limiting the present invention in any way. In the present disclosure, the terms "Example" and "Comparative Example" are used to identify a particular example or experimentation and should not be interpreted as admission of prior art.

What is claimed is:

1. A positive active material for a rechargeable lithium battery consisting essentially of a lithium cobalt-based compound having pH of greater than about 9 and less than 10, wherein the lithium cobalt-based compound is represented by Chemical Formula 1:

$Li_aCo_{1-x}M_xO_2$          Chemical Formula 1 wherein, $0.95 \leq a \leq 1.03$, $0 < x < 0.5$, and

M is Mg, Ca, Sr, Ba, Ti, Cr, Cu, Al, or a combination thereof, wherein the positive active material includes particles having a spherical shape, and wherein the lithium cobalt-based compound includes a secondary particle in which a primary particle is assembled.

2. The positive active material for a rechargeable lithium battery of claim 1, wherein the positive active material has pH of greater than 9 to less than 10.

3. A rechargeable lithium battery, comprising the positive electrode including the positive active material of claim 1;

a negative electrode including a negative active material; and an electrolyte including a lithium salt and an organic solvent.

4. The rechargeable lithium battery of claim 3, wherein the positive electrode has an active mass density of about 3.80 g/cc to about 4.25 g/cc.

5. The rechargeable lithium battery of claim 3, wherein M is Mg, Ca, Sr, Ba, Ti, Cr, Cu, Al, or a combination thereof.

6. The rechargeable lithium battery of claim 5, wherein M is Mg.

7. The rechargeable lithium battery of claim 5, wherein M is Mg, Ti, or a combination thereof.

8. The rechargeable lithium battery of claim 3, wherein the positive active material has pH of 9 to 10.

* * * * *